US010988032B2

(12) United States Patent
Pang

(10) Patent No.: US 10,988,032 B2
(45) Date of Patent: Apr. 27, 2021

(54) SELF-PROPELLED PERSONAL TRANSPORTATION DEVICE

(71) Applicant: Walnut Technology Limited, Kowloon (CN)

(72) Inventor: Yik Hang Pang, Hong Kong (CN)

(73) Assignee: Walnut Technology Limited, Kowloon (CN)

( * ) Notice: Subject to any disclaimer, the term of this patent is extended or adjusted under 35 U.S.C. 154(b) by 0 days.

(21) Appl. No.: 15/273,316

(22) Filed: Sep. 22, 2016

(65) Prior Publication Data

US 2017/0297454 A1    Oct. 19, 2017

Related U.S. Application Data

(60) Provisional application No. 62/324,494, filed on Apr. 19, 2016.

(51) Int. Cl.
*B60L 15/20* (2006.01)
*A63C 17/01* (2006.01)
(Continued)

(52) U.S. Cl.
CPC ........ *B60L 15/2036* (2013.01); *A63C 17/011* (2013.01); *A63C 17/02* (2013.01);
(Continued)

(58) Field of Classification Search
USPC .......................................................... 701/22
See application file for complete search history.

(56) References Cited

U.S. PATENT DOCUMENTS 4,750,578 A    6/1988   Brandenfels
4,947,958 A    8/1990   Snyder
(Continued)

FOREIGN PATENT DOCUMENTS

CN    101501598 A    8/2009
CN    101861554 A    10/2010
(Continued)

OTHER PUBLICATIONS

Wei Sun, Active Wheel System Based Electric Vehicle Dynamic Analysis and Integrated Control, published in Apr. 2015 as a doctoral thesis of Chongqin University, China.
(Continued)

*Primary Examiner* — Muhammad Shafi
(74) *Attorney, Agent, or Firm* — Finnegan, Henderson, Farabow, Garrett & Dunner LLP

(57) ABSTRACT

The present disclosure includes a transportation apparatus. The apparatus comprises: a surface to receive a plurality of forces at a plurality of locations thereon; a plurality of force sensors, attached to the surface, to provide information related to the plurality of forces; a plurality of wheels beneath the surface, each of the plurality of wheels being coupled with a motor; and a controller to: determine, based on the provided information, a first plurality of forces at the plurality of locations; determine, based on the first plurality of forces, a reference distribution associated with the plurality of locations; determine, based on the provided information, a second plurality of forces; determine a target speed and a target direction of the apparatus based on the reference distribution and the second plurality of forces; and provide one or more signals to the motors based on the target speed and the target direction.

18 Claims, 12 Drawing Sheets

(51) Int. Cl.
*A63C 17/02* (2006.01)
*A63C 17/12* (2006.01)

(52) U.S. Cl.
CPC ............ *A63C 17/12* (2013.01); *A63C 17/012* (2013.01); *A63C 17/015* (2013.01); *A63C 2203/12* (2013.01); *B60L 2200/24* (2013.01); *B60L 2240/12* (2013.01); *B60L 2240/14* (2013.01); *B60L 2240/32* (2013.01); *B60L 2240/423* (2013.01); *B60L 2250/00* (2013.01); *Y02T 10/72* (2013.01)

(56) References Cited

U.S. PATENT DOCUMENTS

| | | |
|---|---|---|
| 5,036,938 A | 8/1991 | Blount et al. |
| 5,130,693 A | 7/1992 | Gigandet |
| 5,330,026 A | 7/1994 | Hsu et al. |
| 5,487,441 A | 1/1996 | Endo et al. |
| 5,833,252 A | 11/1998 | Strand |
| 5,893,425 A | 4/1999 | Finkle |
| 6,050,357 A | 4/2000 | Staelin et al. |
| 6,176,337 B1 | 1/2001 | McConnell et al. |
| 6,302,230 B1 | 10/2001 | Kamen et al. |
| 6,336,517 B1 | 1/2002 | Cheng |
| 6,378,642 B1 | 4/2002 | Sutton |
| 6,585,137 B1 | 7/2003 | Archuleta |
| 6,896,084 B2 | 5/2005 | Lo |
| 7,053,288 B2 | 5/2006 | Iwai et al. |
| 7,204,330 B1 | 4/2007 | Lauren |
| 7,293,622 B1 * | 11/2007 | Spital .................... A63C 17/12 180/180 |
| D608,851 S | 1/2010 | Hillman |
| 8,864,152 B1 | 10/2014 | Danze |
| 9,403,573 B1 | 8/2016 | Mazzei et al. |
| 9,950,244 B1 | 4/2018 | Sargis |
| 9,975,035 B1 | 5/2018 | Wang |
| 10,058,764 B2 | 8/2018 | Aders |
| 10,245,936 B2 | 4/2019 | Gillett |
| 2005/0006158 A1 | 1/2005 | Tsai |
| 2005/0139406 A1 | 6/2005 | McLeese |
| 2005/0241864 A1 | 11/2005 | Hiramatsu |
| 2006/0032682 A1 | 2/2006 | Hillman et al. |
| 2006/0049595 A1 | 3/2006 | Crigler et al. |
| 2006/0213711 A1 | 9/2006 | Hara |
| 2007/0076625 A1 | 4/2007 | Tahara et al. |
| 2007/0296170 A1 * | 12/2007 | Field .................... B62K 11/007 280/47.131 |
| 2010/0222941 A1 | 9/2010 | Chang |
| 2010/0230192 A1 | 9/2010 | Riley |
| 2011/0042913 A1 | 2/2011 | Landau |
| 2011/0079976 A1 | 4/2011 | Seip |
| 2013/0081891 A1 | 4/2013 | Ulmen et al. |
| 2013/0206493 A1 | 8/2013 | Larson et al. |
| 2014/0262574 A1 | 9/2014 | Rodgers |
| 2015/0175031 A1 | 6/2015 | Henderson et al. |
| 2015/0306514 A1 | 10/2015 | Mimlitch et al. |
| 2016/0014252 A1 | 1/2016 | Biderman et al. |
| 2016/0059108 A1 | 3/2016 | Demolder |
| 2016/0067588 A1 | 3/2016 | Tan et al. |
| 2016/0332062 A1 | 11/2016 | Wu et al. |
| 2017/0106739 A1 | 4/2017 | Gillett |
| 2017/0252638 A1 | 9/2017 | Ulmen et al. |
| 2018/0036626 A1 | 2/2018 | Carlson |
| 2018/0104567 A1 | 4/2018 | Treadway et al. |
| 2018/0178111 A1 | 6/2018 | Ma |
| 2018/0250581 A1 | 9/2018 | Lemire-Elmore et al. |
| 2018/0264972 A1 | 9/2018 | Pang |
| 2019/0217912 A1 | 7/2019 | Schneider |
| 2019/0275896 A1 | 9/2019 | Miyata et al. |

FOREIGN PATENT DOCUMENTS

| | | |
|---|---|---|
| CN | 103600799 A | 2/2014 |
| CN | 104512502 A | 4/2015 |
| CN | 204736719 U | 11/2015 |
| CN | 105150818 A | 12/2015 |
| CN | 205022785 U | 2/2016 |
| CN | 205034263 U | 2/2016 |
| CN | 105365964 A | 3/2016 |
| CN | 205059842 U | 3/2016 |
| CN | 205150090 U | 4/2016 |
| EP | 1630086 A1 | 3/2006 |
| JP | H10 23613 A | 1/1998 |
| JP | H10 314366 A | 12/1998 |
| KR | 10-0573366 B1 | 4/2006 |
| KR | 10-2009-0078722 A | 7/2009 |
| KR | 10-1703940 B1 | 2/2017 |
| WO | WO 2006/129918 A1 | 12/2006 |
| WO | WO 2011/098935 A2 | 8/2011 |
| WO | WO 2013/120102 A2 | 8/2013 |
| WO | WO 2017/182148 A1 | 10/2017 |

OTHER PUBLICATIONS

Jing Gu, Vehicle Control of Four-Wheel Driven Micro Electric Vehicle, published Jun. 1, 2012 as a doctoral thesis of Tsinghua University, China.

First Search Report in Chinese Application No. 201611206462, dated Oct. 28, 2019 (2 pages). Information and document retrieved from https://globaldossier.uspto.gov/#document-page/CN:201611206462:A.

Supplemental Search Report in Chinese Application No. 201611206462, dated Apr. 2, 2020 (2 pages). Information and document retrieved from https://globaldossier.uspto.gov/#/document-page/CN:201611206462:A.

First Search Report in Chinese Application No. 201710103934, dated Oct. 26, 2019 (3 pages). Information and document retrieved from https://globaldossier.uspto.gov/#/document-page/CN:201710103934:A.

International Search Report in International Application No. PCT/EP2017/052263, dated May 3, 2017 (6 pages).

Written Opinion of the International Searching Authority in International Application No. PCT/EP2017/052263 dated May 3, 2017 (7 pages).

* cited by examiner

SELF-PROPELLED PERSONAL TRANSPORTATION DEVICE

CROSS-REFERENCE TO RELATED APPLICATIONS

The present application is based upon and claims priority to U.S. Provisional Application No. 62/324,494, filed Apr. 19, 2016, entitled "Pressure-Controlled Electrical Vehicles with Pressure Sensors and Motors," the content of which is incorporated herein by reference in its entirety.

TECHNICAL FIELD

The present disclosure relates to a transportation device, and more particularly, to a self-propelled personal transportation device.

BACKGROUND

Personal transportation devices, such as skateboards, roller skates, bicycle, etc., enhance the mobility of people by providing an alternative mode of transportation. Self-propelled personal transportation devices, such as electric skateboards, can transport a person over an extended range and at a relatively high speed, thereby further enhancing the mobility of people.

Although self-propelled personal transportation devices can enhance the mobility of people, they can pose safety problems to the user and to other people. For example, if the device is not operated properly, the user may fall from the device when the device is moving at a high speed. The device may also collide with other people at a high speed. In both cases, an injury may occur.

Conventional self-propelled personal transportation devices, such as electric skateboards, may be controlled by a remote control. However, this may require the user to interact with two devices at the same time (e.g., the remote control and the electric skateboard), which makes the operation non-intuitive and error-prone.

Therefore, there is a need to provide an effective, and intuitive, means for operating a self-propelled personal transportation device.

SUMMARY

The embodiments of the present disclosure provide a system and a method for controlling a transportation device. Advantageously, the exemplary embodiments provide for robust, flexible, intuitive, and easy operation of a transportation device by detecting a distribution of force exerted by a user, and adjusting at least one of a speed and a direction of the transportation device based on the distribution of force.

In one aspect, the present disclosure is directed to a transportation apparatus. The apparatus comprises: a surface to receive a plurality of forces at a plurality of locations thereon; a plurality of force sensors, attached to the surface, to provide information related to the plurality of forces; a plurality of wheels beneath the surface, at least one of the plurality of wheels being coupled with a motor; and a controller to: determine, based on the provided information, a first plurality of forces at the plurality of locations; determine, based on the first plurality of forces, a reference distribution associated with the plurality of locations; determine, based on the provided information, a second plurality of forces; determine a target speed of the apparatus based on the reference distribution and the second plurality of forces; and provide one or more first signals to the motors to cause the apparatus to move at the target speed. In some embodiments, the controller may also determine a target turning direction and provide one or more second signals to the motors based on the target turning direction.

In another aspect, the present disclosure is directed to a computer-implemented method for controlling a transportation device. The method comprises: receiving, from a plurality of force sensors attached to a surface of the transportation device, information about a first plurality of forces at a plurality of locations; determining via a controller, based on the first plurality of forces, a reference distribution, wherein the reference distribution is associated with the plurality of locations; receiving, from the plurality of force sensors, information about a second plurality of forces at a plurality of locations; determining, via the controller, a target speed of the transportation device based on the reference distribution and the second plurality of forces; and providing, via on the controller, one or more first signals to one or more motors of the transportation device to cause the transportation device to move at the target speed. In some embodiments, the method further comprises determining a target turning direction and providing one or more second signals to the motors based on the target turning direction.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

Figure 1C:
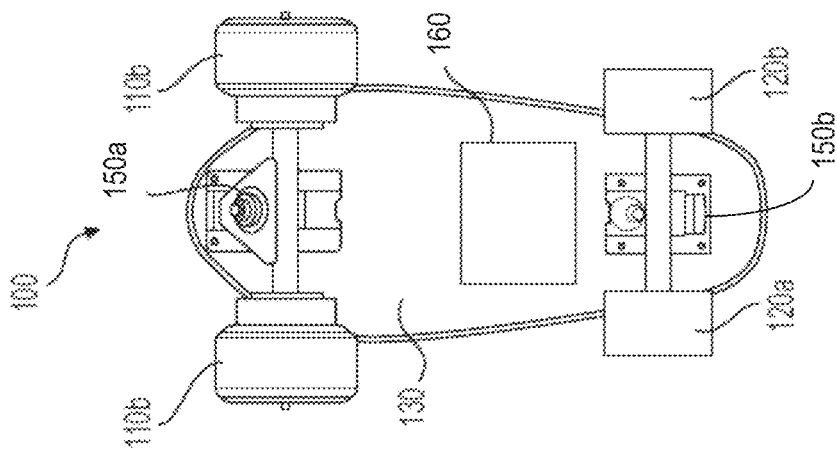
FIGS. 1A-1E are schematic diagrams of an exemplary transportation device, consistent with embodiments of the present disclosure.

The embodiments of the present disclosure provide a system and a method for controlling a transportation device. Embodiments of the present disclosure provide a system that enables a user to control a transportation device by varying a distribution of forces exerted on the device with, for example, a certain posture. The system may adapt the system to a specific posture of a user by determining a reference distribution based on that specific posture. With such an arrangement, the controlling of the transportation device can become more robust, and both the performance and safety of operation can be improved as well.

Reference will now be made in detail to embodiments and aspects of the present disclosure, examples of which are illustrated in the accompanying drawings. Where convenient, the same reference numbers will be used throughout the drawings to refer to the same or like parts.

FIGS. 1A-1E illustrate an exemplary transportation device 100, consistent with embodiments of the present disclosure. FIGS. 1A, 1B, 1C, 1D, and 1E provide, respectively, a perspective view, a top view, a bottom view, a front view, and a side view of transportation device 100. Transportation device 100 may be configured as a skateboard and include a plurality of wheels, e.g., a front pair of wheels comprising a left front wheel 110a and a right front wheel 110b, and a rear pair of wheels comprising a left rear wheel 120a and a left rear wheel 120b. At least one of the plurality of wheels can be an electric motorized wheel, such as a hub-motor driven wheels, a gear-motor driven wheel, a belt-motor driven wheels, etc. As an illustrative example, left front wheel 110a and right front wheel 110b may be driven by a left-side electric motor and a right-side electric motor respectively. In some embodiments, left rear wheel 120a and right rear wheel 120b can also be driven by, respectively, a left-side electric motor and a right-side electric motor. In some embodiments, a pair of front wheels (and/or a pair of rear wheels) can be driven by a single motor via a gearbox, which can be configured to drive each of the pair of wheels at a predetermined rotational speed, and can also be configured to drive the wheels at different rotational speeds.

Transportation device 100 may further include a deck 130 that provides a top surface for supporting a user. The top surface of deck 130 includes a force sensor module 140. Force sensor module 140 may include one or more force sensors configured to detect a force received at predetermined locations of the top surface. For example, as shown in FIG. 1B, force sensor module 140 may be distributed across a deck portion 130a, a deck portion 130b, a deck portion 130c, a deck portion 130d, and a deck portion 130e. In some embodiments, force sensor module 140 may be a thin layer of electric force sensing units with force sensing resistance or force sensing electric capacity. The force sensing units may include, for example, Piezoelectric Thin Film sensors made of polyvinylidene fluoride (PVDF). As to be discussed in more detail below, with such an arrangement, transportation device 100 can be controlled based on a distribution of forces (e.g., exerted by a weight of the user) received by portions of force sensor module 140 that correspond to the deck portions 130a-130e, and the distribution of forces can vary based on a posture of the user (e.g., standing straight, leaning forward, leaning backward, leaning left, leaning right, etc.). As a result, the user can interact with the top surface to control a movement of transportation device 100.

Moreover, deck 130 also includes a bottom surface, on which a pair of trucks 150a and 150b is mounted. Truck 150a is configured to attach left front wheel 110a and right front wheel 110b to the bottom surface, while truck 150b is configured to attach left rear wheel 120a and right rear wheel 120b to the bottom surface. At least one of trucks 150a and 150b is also rotatable to provide steering to transportation device 100. In some embodiments, the steering of transportation device 100 can be further facilitated by introducing a difference in the rotation speeds between at least one of the front pair of wheels and at least one of the rear pair of wheels, or a difference in the rotation speeds between at least one of the left pair of wheels and at least one of the right pair of wheels. For example, in a case where left front wheel 110a and right front wheel 110b are driven by a left-side electric motor and a right-side electric motor respectively, the left-side electric motor and the right-side electric motor can be controlled to rotate at different rotational speeds, to facilitate the steering of transportation device 100 (e.g., by reducing a turning radius).

Figure 1B:
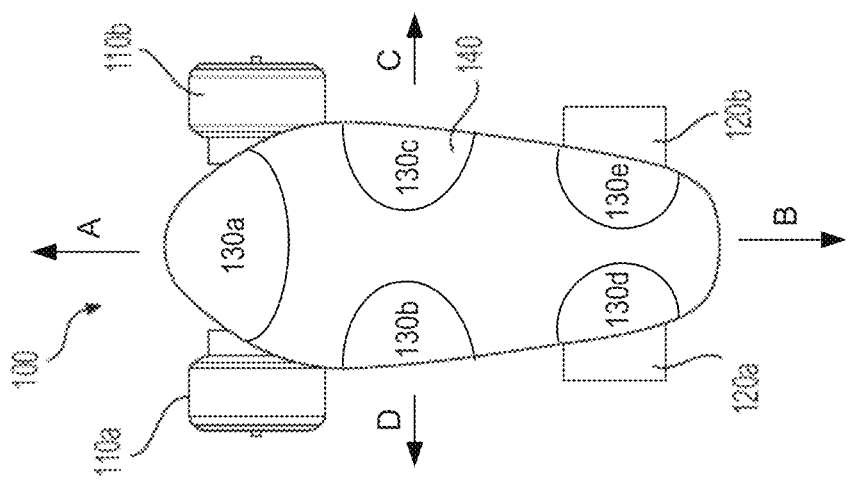
Figure 1A:
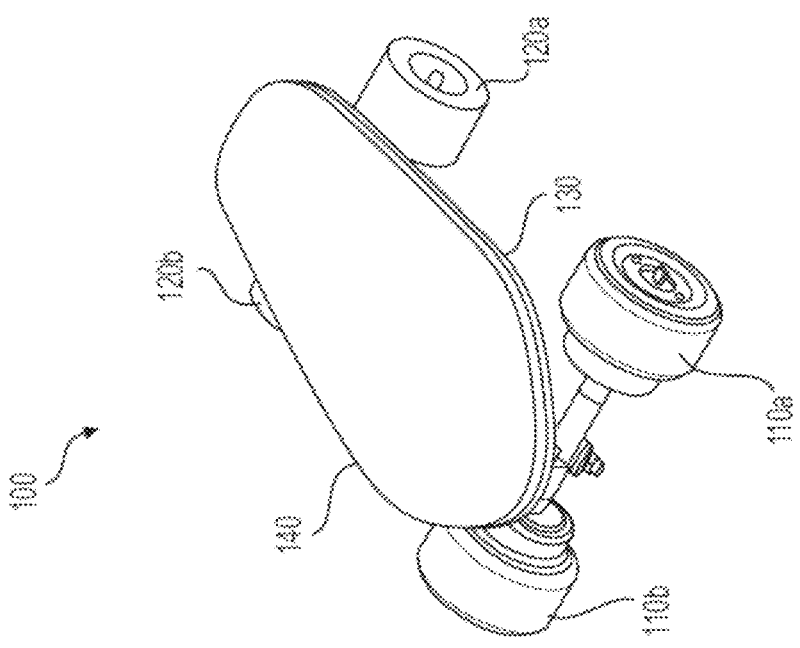
Figure 1E:
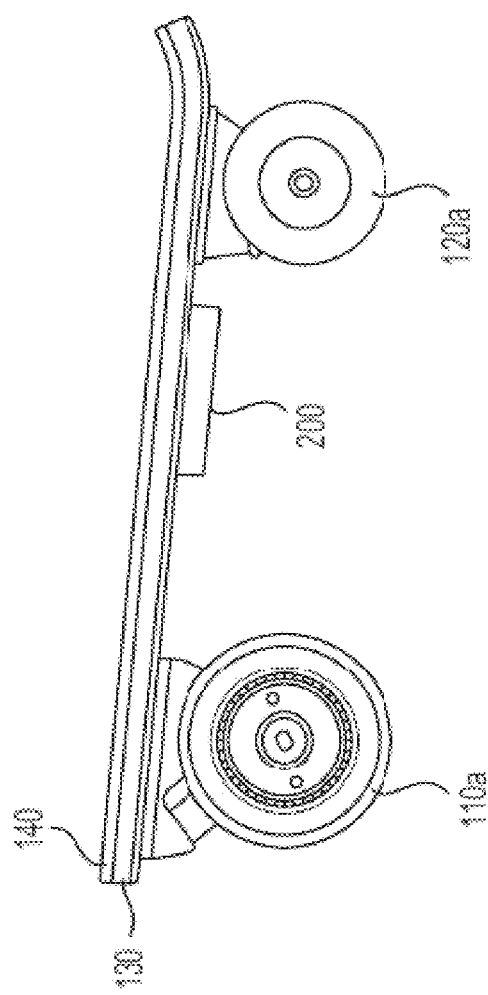
Figure 1D:
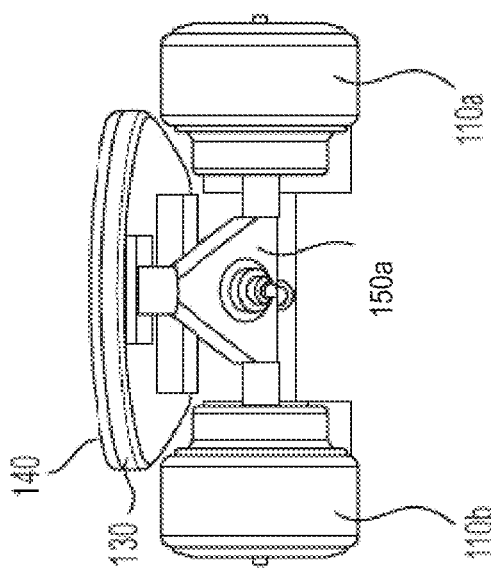

As shown in FIG. 1C, transportation device 100 further includes a controller 160. Controller 160 may be mounted on the bottom surface of deck 130 (as shown in FIG. 1C), or may be placed anywhere on or within deck 130, and may be configured to control a rotation direction and a rotation speed of the one or more motors that drive the plurality of wheels. Controller 160 may include one or more known processing devices. For example, the processor may be from the family of processors manufactured by Intel, from the family of processors manufactured by Advanced Micro Devices, or the like. Alternatively, the processor may be based on the ARM architecture. Further, controller 160 can also include an application-specific integrated circuit (ASIC), a field programmable gate array (FPGA), etc. Controller 160 can be programmed to perform one or more methods consistent with embodiments of the present disclosure.

In some embodiments, controller 160 is configured to determine a target direction (e.g., forward, backward, left, or right) and a target speed of movement of transportation device 100, and control the one or more motors to achieve the target direction and the target speed of movement. Controller 160 can receive information, from force sensor module 140, about the magnitudes of forces received at a plurality of predetermined locations on the top surface of deck 130. Controller 160 can then determine a distribution of forces based on the information. Based on the distribution of forces and an operation state of transportation device 100, controller 160 can determine a target speed and a target direction of movement of transportation device 100.

For example, when transportation device 100 is in a stationary state (e.g., when the device is just powered up, or have been controlled to stop), transportation device 100 may determine, based on the distribution of forces, whether the user is standing stably, for a predetermined amount of time (e.g., five seconds). If controller 160 determines that the user is standing stably for at least the predetermined amount of time, which may indicate that the user is standing upright, controller 160 (and transportation device 100) may enter an initialization state, in which it determines a reference distribution based on the distribution of forces, and then enter a motion state. As to be discussed in detail below, the reference distribution can be used for detecting changes in the distribution of forces, and the degrees of the changes, which can indicate a posture change of the user. Controller 160 can interpret the posture change as a signal to adjust a movement of transportation device 100 and, based on a relationship between the reference distribution and the updated distribution of forces, adjust a magnitude of the signal. With such an arrangement, the detection of a user's signal to adjust the movement of transportation device 100 can be customized to take into account the different weights of different users, as well as their different standing postures. This enables more accurate detection of the user's signals to adjust the movement of the transportation device, therefore the system can become more robust.

In the motion state, controller 160 can detect, based on information provided from force sensor module 140, whether there is a change in the distribution of the forces which, as discussed above, may indicate a change in the posture. Based on a relationship between the updated distribution of the forces and the reference distribution, controller 160 can then determine a target speed and a target direction of movement of transportation device 100. As an illustrative example, controller 160 may detect that a force detected at front deck portion 130a is larger than the forces detected at other sensor portions, and determine that transportation device 100 is to move forward (as indicated by direction A). Moreover, controller 160 can also determine a target speed of transportation device 100 based on the magnitudes of forces detected at each of deck portions 130a, 130b, 130c, and 130d, and the reference distribution.

In some embodiments, controller 160 can also set the target speed to zero after determining, based on the information from force sensor module 140, that the total forces received by the top surface of deck 130, at any given time, is lower than a threshold. This can indicate, for example, that the user has fallen off (or in the middle of falling off) transportation device 100 and is not in control of it. The threshold can be preset to an initial value when transportation device 100 is in the stationary state, and can be updated based on the reference distribution (e.g., to reflect the user's weight) when transportation device 100 is in the motion state. With such an arrangement, the risk of transportation device 100 hitting a person nearby, when the device is not under a user's control, can be mitigated.

After setting the target speed and the target direction of movement, controller 160 can then control a rotation direction and a rotation speed of the one or more motors to achieve the target speed and the target direction. For example, as discussed above, controller 160 can transmit signals to a left-side electric motor that drives left front wheel 110a, and to a right-side electric motor that drives right front wheel 110b, to introduce a rotation speed difference between the front pair of wheels, in order to steer transportation device 100 to move along the target direction. Moreover, controller 160 can also transmit signals to both the left-side electric motor and the right-side electric motor to control the motors to rotate at a certain rotation speed, to achieve the target speed.

In some embodiments, controller 160 can also be a part of a feedback system that controls the target speed and the target direction. For example, transportation device 100 may include a motor speed sensor that detects a rotation speed of the electric motors. Based on a difference between the rotational speed of the electric motors and a target rotational speed (which can be determined based on the target speed of movement of transportation device 100), controller 160 can then adjust the signals provided to the electric motors to introduce an acceleration (or deceleration) to achieve the target speed. The acceleration (or deceleration) can be set based on a predetermined responsiveness of the system, which can be set according to different operation states of transportation device 100 and for different purposes. As an illustrative example, when transportation device 100 is moving in a relatively high speed, the responsiveness can be increased (e.g., to improve performance), or decreased (e.g., to improve safety). Also, if controller 160 determines to set the target speed to zero in response to an indication that the user has fallen off (or in the middle of falling off) transportation device 100 (e.g., based on a determination that the total forces received by the top surface is below a threshold), it can control the rotational speed of the motors to zero within a predetermined amount of time (e.g., one second), to further mitigate the risk of transportation device 100 hitting another person while moving out of control.

Further, transportation device 100 may include an orientation sensor (e.g., an inertial measurement unit (IMU)) attached to the bottom surface of deck 130 and configured to detect a current turning angle and/or a current turning speed of deck 130. Controller 160 can then adjust the signals provided to the left-side electric motor and the right-side electric motor (e.g., for introducing a differential rotational speed) based on a difference between the target direction and a current direction of movement of transportation device 100.

Moreover, the IMU may provide information about a pitch angle of transportation device 100 that may indicate, for example, the transportation device is going uphill or downhill. In such a case, controller 160 may also adjust the signals provided to the left-side electric motor and the right-side electric motor accordingly. For example, if the pitch angle indicates that transportation device 100 is going uphill, controller 160 may increase the torques of both of the left-side electric motor and the right-side electric motor to provide more assistance for the uphill movement. Also, if the pitch angle indicates that transportation device 100 is going downhill, controller 160 may decrease the torques of both of the left-side electric motor and the right-side electric motor (or cause the motor to generate reverse braking torque) to reduce the speed. In some embodiments, transportation device 100 may be able to adjust the motor torque according to the pitch angle when the pitch angle is within a range of ±15 degrees with respect to the horizon.

In some embodiments, controller 160 may also receive signals from a remote control (not shown in FIGS. 1A-1E), and control an operation state (and/or a target speed and a target direction of movement) of transportation device 100. As an illustrative example, controller 160 may receive a signal from a remote control to maintain transportation device 100 in the stationary state, for security purpose. Controller 160 may also receive a signal from a remote control to set a target speed and a target direction of movement of transportation device 100 as a backup (e.g., when force sensor module 140 fails).

Figure 2:
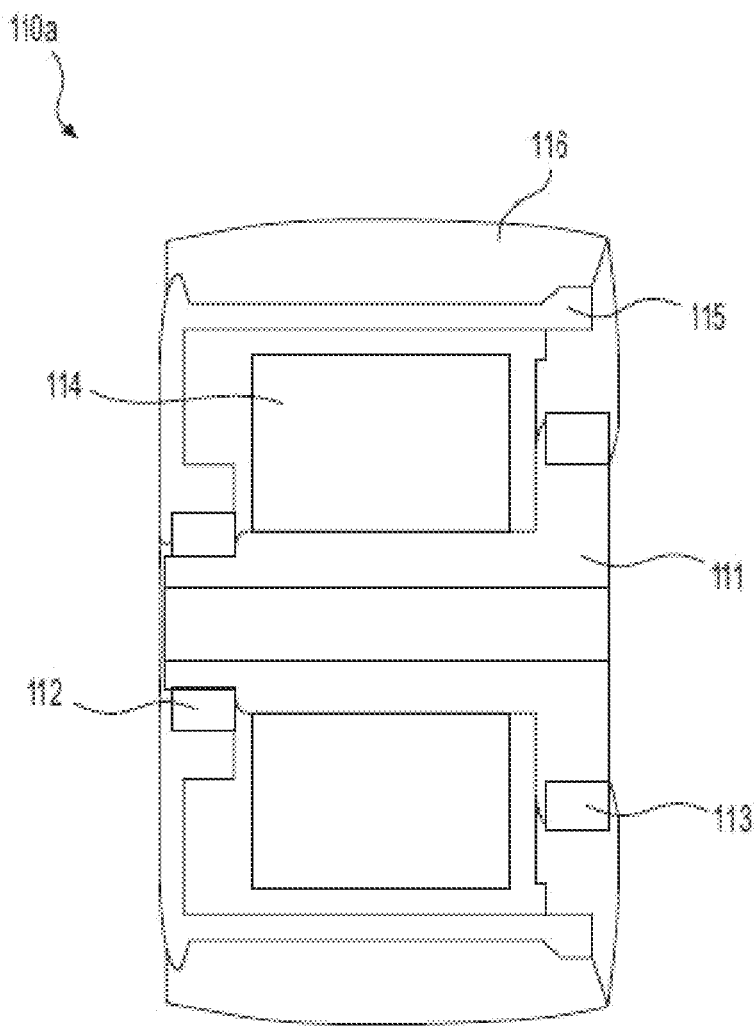
FIG. 2 illustrates a cross-section of an exemplary electric motorized wheel, consistent with embodiments of the present disclosure.

FIG. 2 is a cross-section view of an exemplary left front wheel 110a driven by a hub motor, consistent with embodiments of the present disclosure. The exemplary hub-motor driven wheel includes an axis 111, bearings 112 and 113, an inner stator 114 coupled to axis 111, an outer rotor 115 coupled to axis 111 via bearings 112 and 113, and a damping tire 116 directly attached to outer rotor 115. The exemplary hub-motor driven left front wheel 110a combines a motor (e.g., stator 114 and rotor 115) and tire 116 together, such that tire 116 is directly attached to the outer rotor, unlike conventional motorized wheels using an outer rotor to drive a metal case to which a tire is attached.

In some embodiments, damping tire 116 includes an elastic material absorbing vibration to protect outer rotor 115, inner stator 114, and other components of the wheel. It may also include an abradable material reducing wear when touching the ground. In some embodiments, damping tire 116 includes an inner layer and an outer layer (not shown in FIG. 2). The outer layer is made of a material with low elasticity and high abradability when touching the ground. The inner layer functions as a damping part, made of a material with high elasticity absorbing vibration to protect the outer rotor, inner rotor, and other components of the wheel.

Figure 3C:
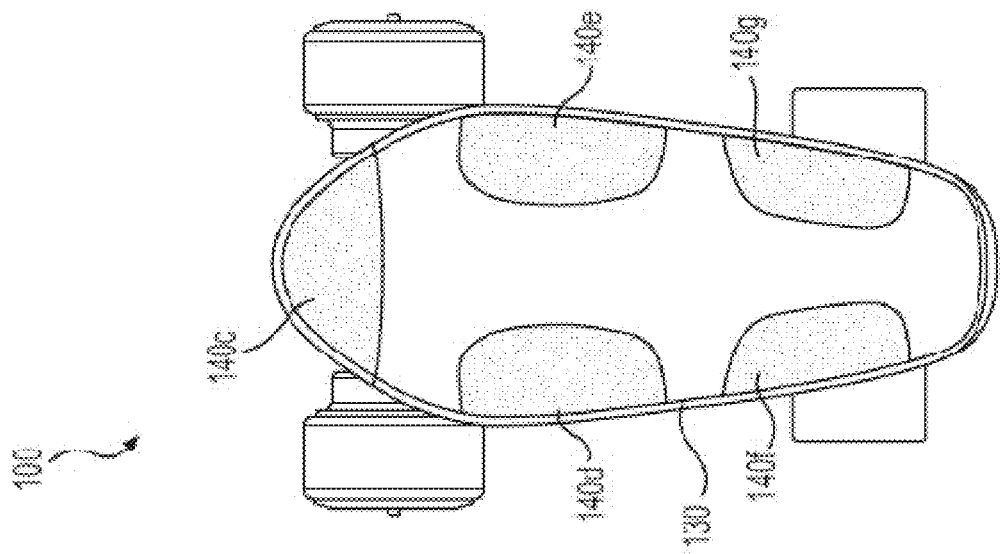
FIGS. 3A-3C are schematic diagrams of an exemplary force sensor module, consistent with embodiments of the present disclosure.
Figure 3B:
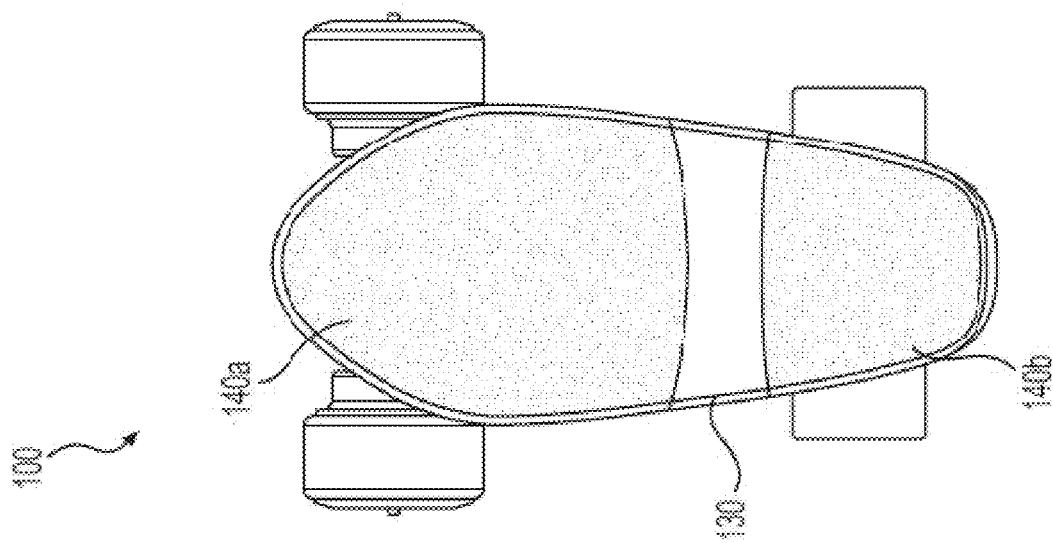
Figure 3A:
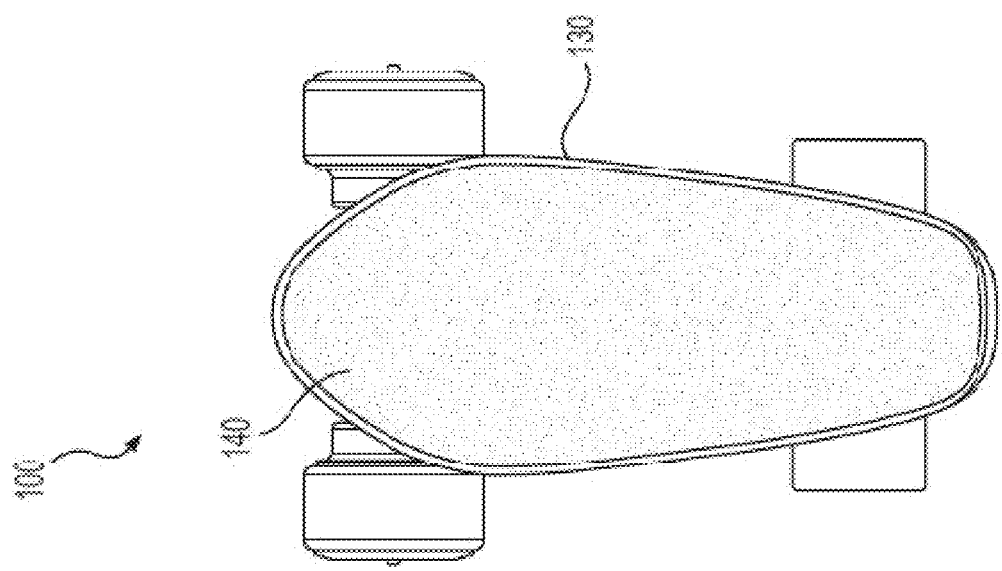

FIGS. 3A-3C illustrate various examples of force sensor module 140, consistent with embodiments of the present disclosure. In some embodiments, as shown in FIG. 3A, force sensor module 140 may include a single force sensor region extending across the top surface of deck 130. Also, in some embodiments, as shown in FIG. 3B, force sensor module 140 may include a front force sensor region 140a and a rear force sensor region 140b. Front force sensor region 140a may extend across a front section of deck 130 (which includes, for example, front deck portion 130a), and rear force sensor region 140b may extend across a rear section of deck 130 (which includes, for example, rear deck portion 130b). Further, in some embodiments, as shown in FIG. 3C, force sensor module 140 may also include more than two force sensor regions, including a front force sensor region 140c, a left front force sensor region 140d, a right front force sensor region 140e, a left rear force sensor region 140f, and a right rear force sensor region 140g. Each of these force sensor regions may comprise one or more force sensing units described above.

Figure 4A:
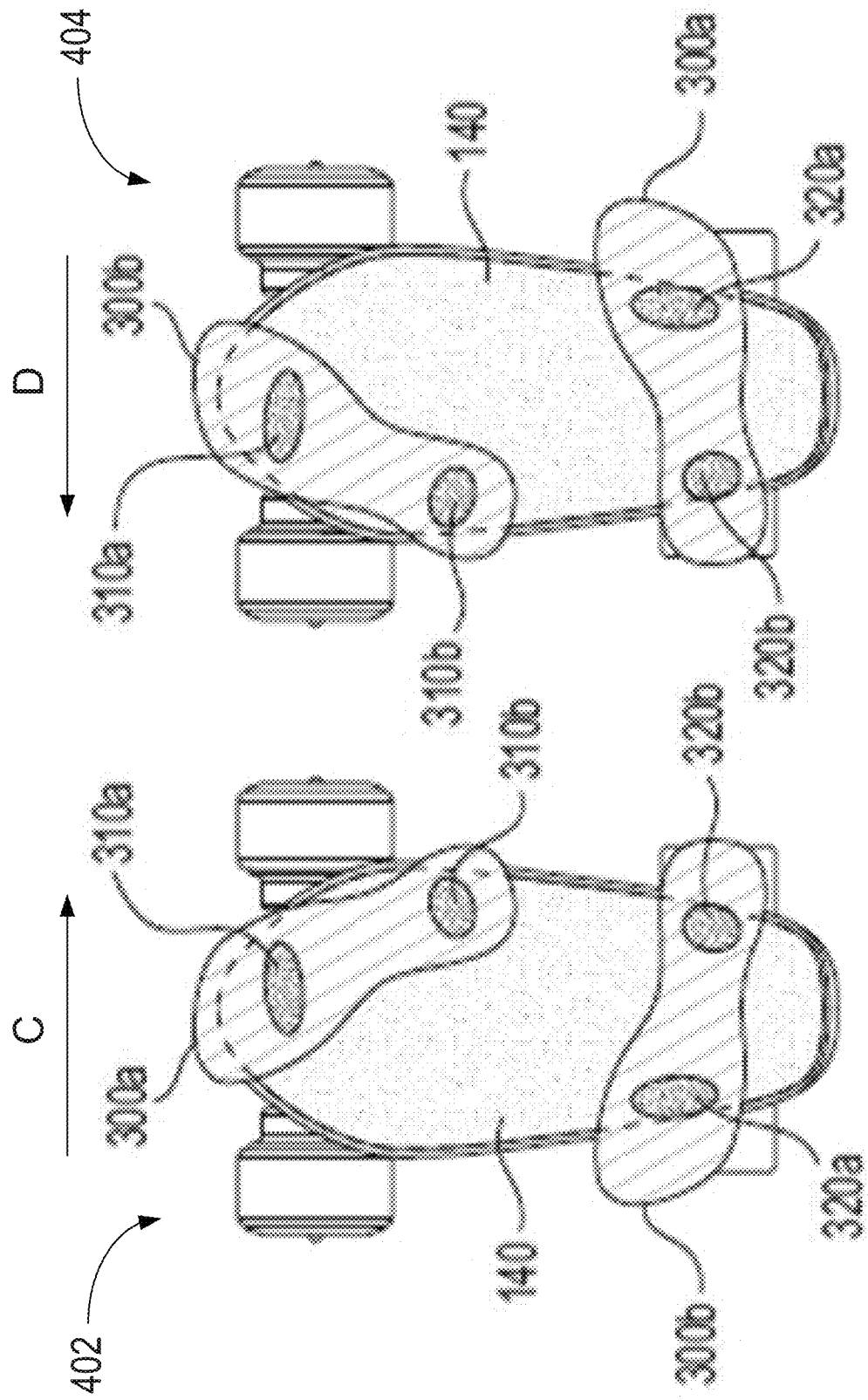
FIGS. 4A-4C illustrate examples of detections of force by the exemplary force sensor modules of FIG. 3A-3C.
Figure 4B:
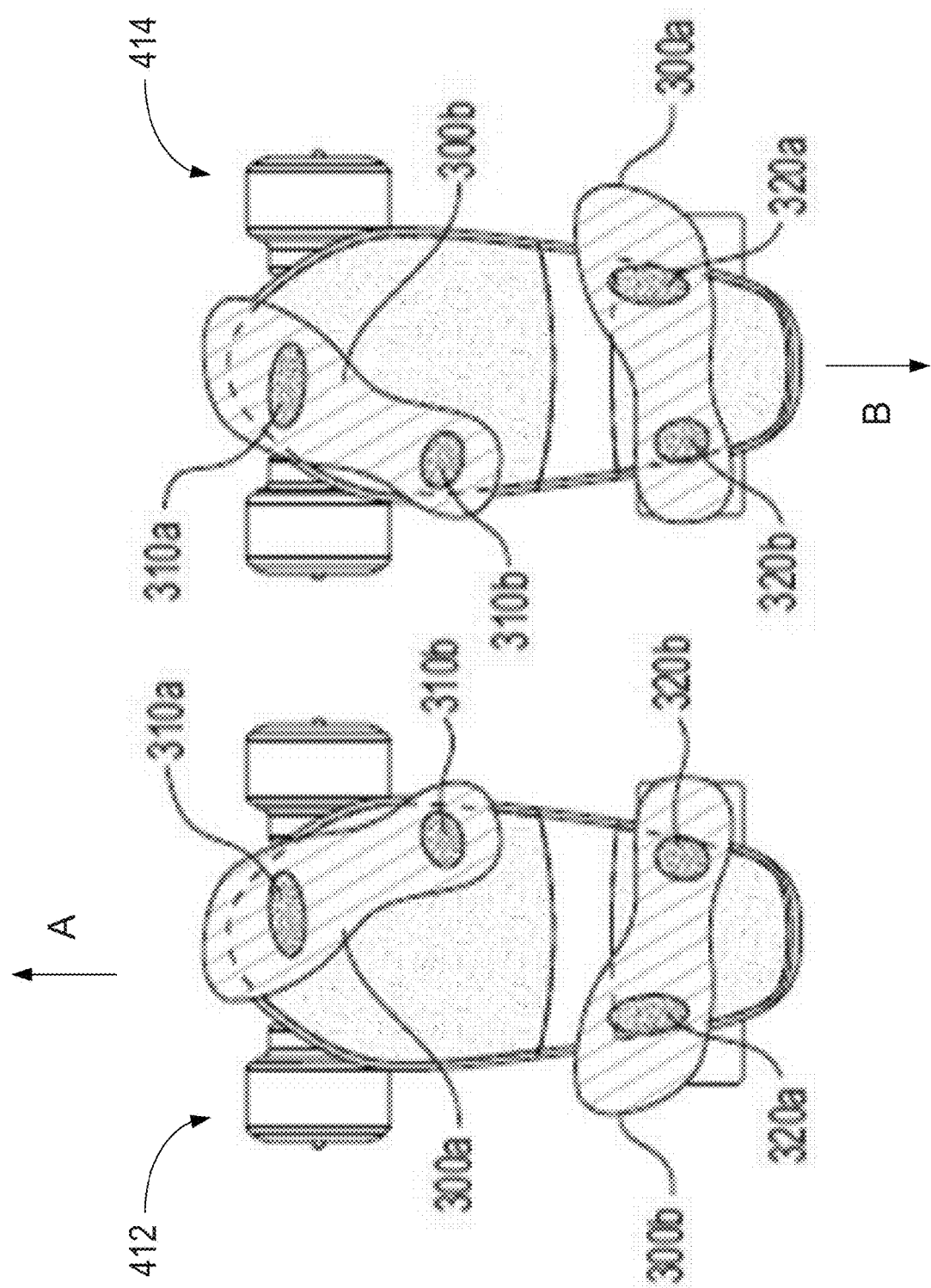
Figure 4C:
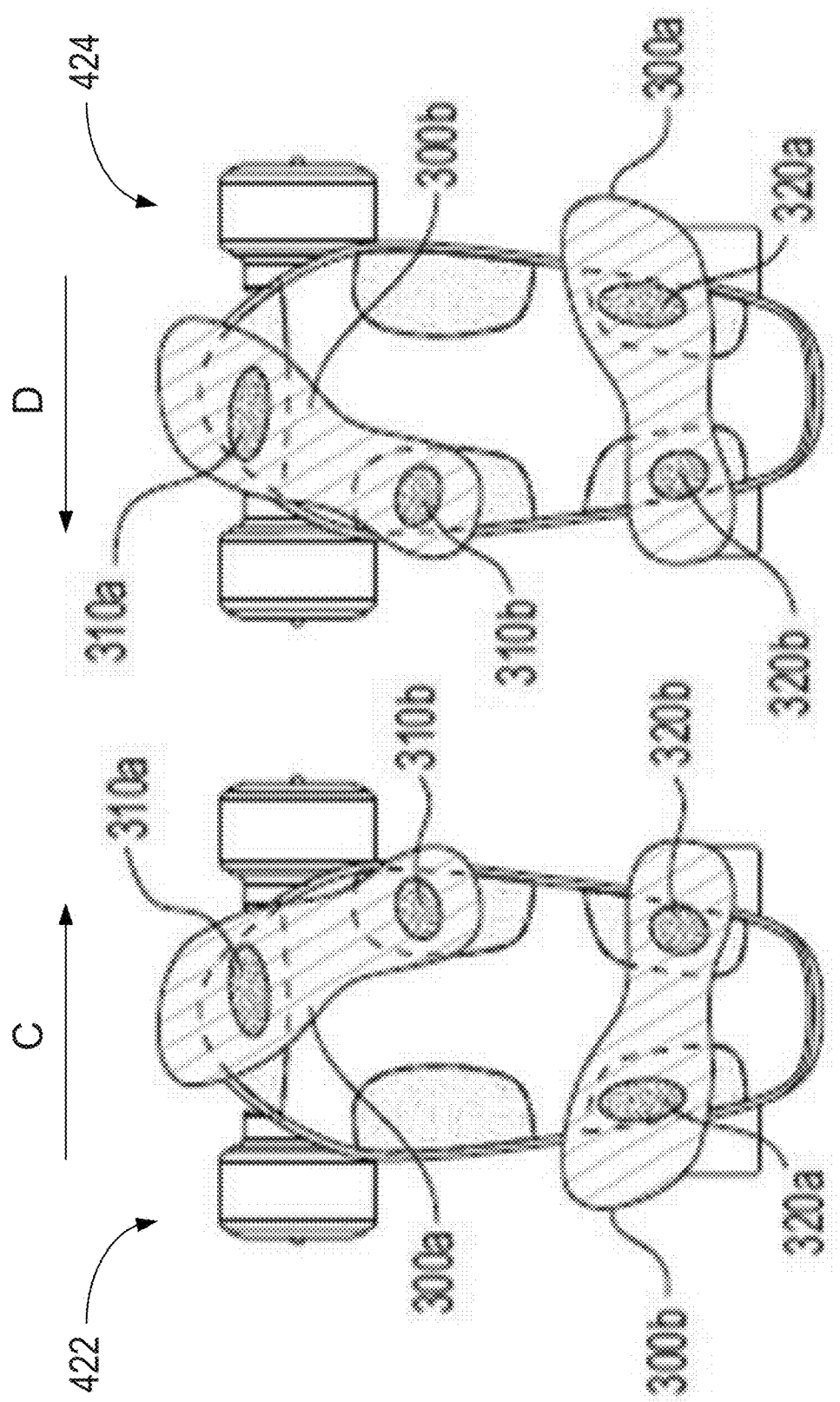

FIGS. 4A-4C illustrate exemplary configurations for detecting a distribution of forces with the exemplary force sensors illustrated in FIGS. 3A-3C, consistent with embodiments of the present disclosure. As an illustrative example, referring to FIG. 4A, diagram 402 illustrates one possible set of locations of foot regions 300a and 300b of a user standing on the top surface of deck 130, which is covered with a single force sensor module 140 as shown in FIG. 3A. Moreover, diagram 404 illustrates another possible set of locations of foot regions 300a and 300b. Sensor module 140 can detect a first force in a region 310a and a second force in a region 310b of foot region 300a. Force sensor module 140 can also detect a third force in a region 320a and a fourth force in a region 320b of foot region 300b. Force sensor module 140 can then provide information about the first, second, third, and fourth forces, and their associated regions (regions 310a, 310b, 320a, and 320b) in force sensor module 140, to controller 160, which can then determine a distribution of forces accordingly. For example, based on a distribution of force generated according to the set of locations of foot regions 300a and 300b of diagram 402, controller 160 may determine to steer transportation device 100 towards direction C. Further, based on a distribution of force generated according to the set of locations of foot regions 300a and 300b of diagram 404, controller 160 may determine to steer transportation device 100 towards direction D.

As another illustrative example, FIG. 4B illustrates that foot regions 300a and 300b that partially overlap with, respectively, front force sensor region 140a and rear force sensor region 140b of FIG. 3B. Referring to FIG. 4B, diagram 412 illustrates one possible set of locations of foot regions 300a and 300b on front sensor region 140a and rear sensor region 140b, and diagram 414 illustrates another possible set of locations of foot regions 300a and 300b on front force sensor region 140a and rear force sensor region 140b. Controller 160 may then determine a distribution of force by associating the measured forces with each of the sensor regions, and with the locations of the measured force within each sensor region. Based on a distribution of force generated according to the set of locations of foot regions 300a and 300b of diagram 412, controller 160 may determine to steer transportation device 100 towards, for example, directions A, B, C, D, or anywhere in between (e.g., between directions A and B). Further, based on a distribution of force generated according to the set of locations of foot regions 300a and 300b of diagram 414, controller 160 may determine to steer transportation device 100 towards direction B.

As another illustrative example, diagram 422 of FIG. 4C illustrates that region 310a and region 310b of foot region 300a overlap with, respectively, front force sensor region 140c and right front force sensor region 140e of FIG. 3C, while region 320a and region 320b of foot region 300b overlap with, respectively, left rear force sensor region 140c and right rear force sensor region 140e of FIG. 3C. Moreover, diagram 424 of FIG. 4C illustrates that region 310a and region 310b of foot region 300a overlap with, respectively, front force sensor region 140c and left front force sensor region 140d of FIG. 3C, while region 320a and region 320b of foot region 300b overlap with, respectively, right rear force sensor region 140c and left rear force sensor region 140e of FIG. 3C. Controller 160 may then determine a distribution of force by associating the measured forces with each of the sensor regions. Based on a distribution of force generated according to the set of locations of foot regions 300a and 300b of diagram 422, controller 160 may determine to steer transportation device 100 towards direction C. Further, based on a distribution of force generated according to the set of locations of foot regions 300a and 300b of diagram 424, controller 160 may determine to steer transportation device 100 towards direction D.

Figure 5A:
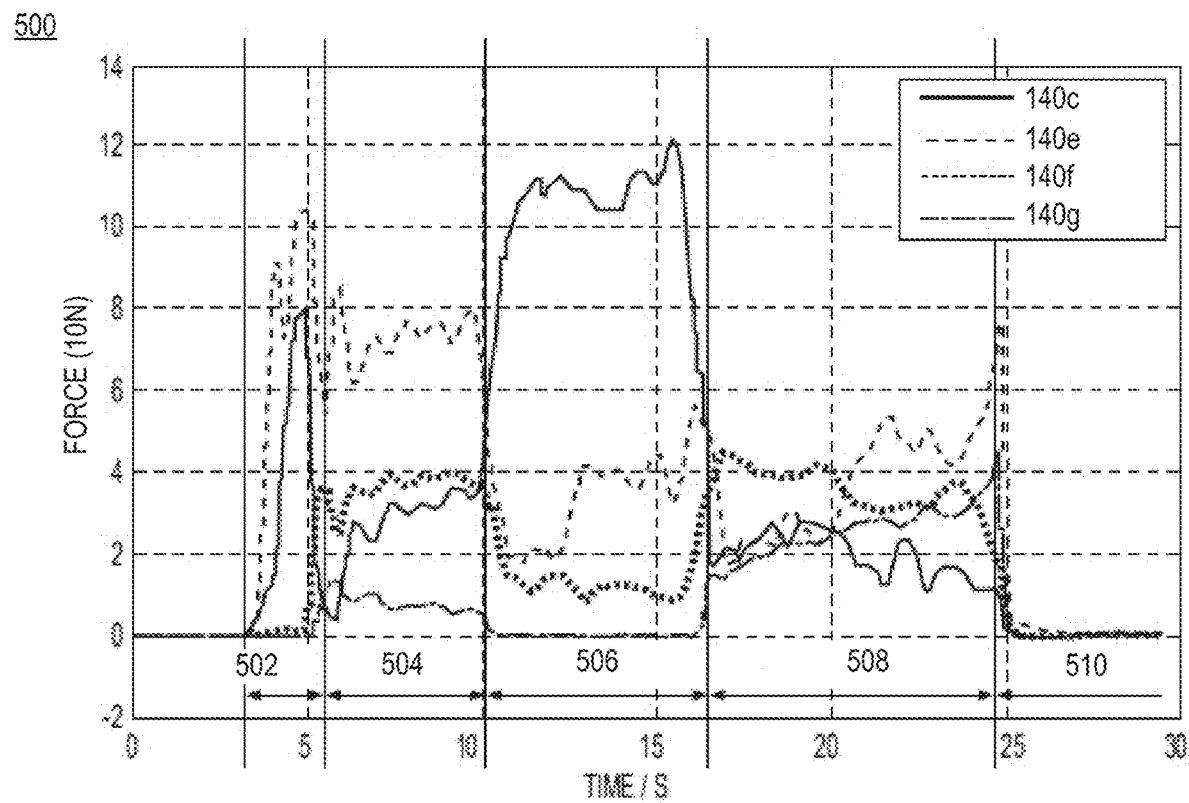
FIGS. 5A-5B illustrate examples of variations of force distribution based on which a target speed and a target direction can be determined using exemplary configurations consistent with embodiments of the present disclosure.
Figure 5B:
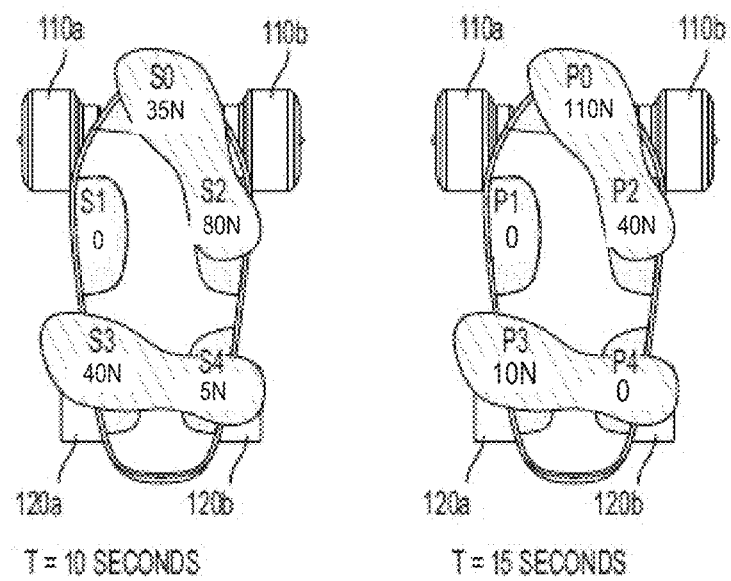

FIGS. 5A and 5B illustrate examples of variations of force distribution, which can be used for determining a target speed and a target direction using exemplary configurations consistent with embodiments of the present disclosure. Although the variations are illustrated using the example of force sensor module 140 including force sensor regions 140c-g as illustrated in FIG. 3C, it is understood that the method can also be used in conjunction with the examples of force sensor module 140 of FIG. 3A and FIG. 3B.

As shown in FIG. 5A, chart 500 illustrates a variation of forces detected by force sensor regions 140c, 140e, 140f, and 140g with respect to time. For example, referring to FIG. 5B, at around 10 seconds after a reference time point, force sensor region 140c measures a force of 35 N (Newton), force sensor region 140d measures a force of 0 N, force sensor region 140e measures a force of 80 N, force sensor region 140f measures a force of 40 N, and force sensor region 140g measures a force of 5 N. Also, at 15 seconds after the reference time point, force sensor region 140c measures a force of 110 N, force sensor region 140d measures a force of 0 N, force sensor region 140e measures a force of 40 N, force sensor region 140f measures a force of 10 N, and force sensor region 140g measures a force of 0 N.

Based on the distribution of the forces among the sensor regions, and a variation of the forces with respect to time, controller 160 can determine an operation state of transportation device 100. For example, referring to FIG. 5A, during time interval 502 when transportation device 100 is in an initialization state and the user steps onto the device, the forces detected by force sensor module 140 may experience a relatively huge variation with respect to time. Controller 160 can determine that there is a relatively huge variation of the forces with respect to time by, for example, determining a variance value for the samples of detected force received up to the current time, and compare the variance value against a variance threshold. If the variance value exceeds the variance threshold, controller 160 may determine that the transportation device 100 is to remain in the stationary state as the user is still adjusting his or her standing posture on the device.

Proceeding to time interval 504, as the user's standing posture becomes stable, the forces detected by force sensor module 140 may experience a relatively less variation with respect to time. In that case, controller 160 may determine that the variance value for the samples of detected force is below the variance threshold. Based on this determination, controller may determine, based on the current distribution of forces, a reference distribution of forces. The reference distribution of forces can act as an indicator that the user is standing upright on the transportation device. Controller 160 may interpret such a standing posture as a signal that transportation device is to maintain its current state (e.g., stationary state, or a motion state with a fixed direction and speed of motion). Controller 160 can then use the reference distribution of forces as a reference to determine a change in the direction and/or speed of motion, after detecting changes in the distribution of force.

In some embodiments, controller 160 may determine the reference distribution of forces by calculating a force reference for the front deck portion ($S_{front}$), a force reference for the rear deck portion ($S_{rear}$), a force reference for the left deck portion ($S_{left}$), and a force reference for the right deck portion ($S_{right}$). Assuming that the magnitudes of the forces detected by force sensor region 140c, 140d, 140e, 140f, and 140g are, respectively, $S_0$, $S_1$, $S_2$, $S_3$, and $S_4$, controller 160 can determine the reference distribution, in the form of a distribution of ratios, according to the following exemplary expressions:

$$S_{sum} = S_0 + S_1 + S_2 + S_3 + S_4 \quad \text{(Expression 1)}$$

$$S_{front} = \frac{S_0 + S_1 + S_2}{S_{sum}} \quad \text{(Expression 2)}$$

$$S_{rear} = \frac{S_3 + S_4}{S_{sum}} \quad \text{(Expression 3)}$$

$$S_{left} = \frac{S_0/2 + S_1 + S_3}{S_{sum}} \quad \text{(Expression 4)}$$

$$S_{right} = \frac{S_0/2 + S_2 + S_4}{S_{sum}} \quad \text{(Expression 5)}$$

As an illustrative example, referring back to FIG. 5A, at around 10 seconds after the reference time point, force sensor regions 140c-g obtain a reading of 35 N for $S_0$, a reading of 0 N for $S_1$, a reading of 80 N for $S_2$, a reading of 40 N for $S_3$, and a reading of 5 N for $S_4$. Based on the Expressions 1-5 as discussed above, a reference distribution can be determined as follows:

TABLE 1

| $S_{front}$ | $S_{rear}$ | $S_{left}$ | $S_{right}$ |
|---|---|---|---|
| 72% | 28% | 36% | 64% |

Table 1 illustrates a reference distribution, which can be associated with an indication that the user is standing stably and upright on transportation device 100. Controller 160 can then detect, based on a relationship between the reference distribution and a current distribution of forces, whether there is a posture change of the user, the change of speed and direction of motion signaled by the posture change, and the degree of change, as to be discussed below.

In some embodiments, before entering the motion state, controller 160 also compares a sum of the forces $S_{sum}$ against a predetermined initial threshold. The sum of the forces $S_{sum}$ typically reflects the weight of the user. If controller 160 determines that $S_{sum}$ is below a predetermined initial threshold, controller 160 may determine that the user has fallen off (or in the middle of falling off) the transportation device, and is no longer in control of it. In that case, controller 160 may maintain the transportation device in the stationary state, or if the transportation device is in the motion state, bring the transportation device to stop (by setting the target speed as zero). On the other hand, if $S_{sum}$ exceeds the predetermined initial threshold, controller 160 may update the threshold based on $S_{sum}$ (e.g., by setting the threshold to be equal to half of $S_{sum}$), and continue to monitor the sum of forces detected by force sensor regions 140c-140g. For example, referring back to FIG. 5A, during interval 510 controller 160 may determine that a sum of current forces falls the updated threshold, and bring the transportation device to stop.

In the motion state, controller 160 may determine a change in the distribution of force, and the degree of change, based on the forces detected by force sensor regions 140c-g and the reference distribution. Based on the change, controller 160 may determine an indication from the user for a change in the movement of the transportation device. Controller 160 can then determine an updated speed and/or an updated direction of movement of the transportation device, based on the indication.

For example, in the motion state, the magnitudes of the forces detected by force sensor regions 140c, 140d, 140e, 140f, and 140g are, respectively, $P_0$, $P_1$, $P_2$, $P_3$, and $P_4$. Controller 160 can determine a distribution of force, represented by a combination of ratios $P_{front}$, $P_{rear}$, $P_{left}$, and $P_{right}$, according to the following exemplary expressions:

$$P_{sum} = P_0 + P_1 + P_2 + P_3 + P_4 \quad \text{(Expression 6)}$$

$$P_{front} = \frac{P_0 + P_1 + P_2}{P_{sum}} \quad \text{(Expression 7)}$$

$$P_{rear} = \frac{P_3 + P_4}{P_{sum}} \quad \text{(Expression 8)}$$

$$P_{left} = \frac{P_0/2 + P_1 + P_3}{P_{sum}} \quad \text{(Expression 9)}$$

$$P_{right} = \frac{P_0/2 + P_2 + P_4}{P_{sum}} \quad \text{(Expression 10)}$$

Controller 160 can then determine an angle of tilting forward ($d_{forward}$) and an angle of tilting left ($d_{left}$) based on the distribution of forces $P_{front}$, $P_{rear}$, $P_{left}$, and $P_{right}$ and the reference distribution $S_{front}$, $S_{rear}$, $S_{left}$, and $S_{right}$, according to the following exemplary expressions:

$$d_{forward} = \left(\frac{P_{front}}{S_{front}} - \frac{P_{rear}}{S_{rear}}\right) \times K_{forward} \quad \text{(Expression 11)}$$

-continued $$d_{left} = \left(\frac{P_{left}}{S_{left}} - \frac{P_{right}}{S_{right}}\right) \times K_{left} \quad \text{(Expression 12)}$$

Here, $K_{forward}$ and $K_{left}$ can be a scaling factor with a typical value of 5.

Controller 160 may determine an indication of direction of movement based on $d_{forward}$ and $d_{left}$. For example, if $d_{forward}$ exceeds zero, controller 160 may determine that the user signals the transportation device to move forward, and if $d_{forward}$ is below zero, that the user signals the transportation device to move backward. Also, if $d_{left}$ exceeds zero, controller 160 may determine that the user signals the transportation device to move left, and if $d_{left}$ is below zero, that the user signals the transportation device to move to the right. Further, if both $d_{forward}$ and $d_{left}$ are zero, controller 160 may determine that user signals the transportation device to maintain its current direction and speed of movement.

In some embodiments, the parameters $d_{forward}$ and $d_{left}$ may represent a tilting angle of the user with respect to the horizon. As to be discussed below in detail, the values of $d_{forward}$ and $d_{left}$ can be related to a force exerted by the person along a direction of acceleration. Based on the magnitude and direction (indicated by whether the value exceeds zero) of $d_{forward}$ and $d_{left}$, controller 160 can determine a target speed and a target direction of movement of transportation device 100.

As an illustrative example, at a certain time point within interval 506 (e.g., at 15 seconds after the reference time point), force sensor regions 140c, 140d, 140e, 140f, and 140g obtain the values of $P_0$, $P_1$, $P_2$, $P_3$, and $P_4$ as, respectively, 110 N, 0 N, 40 N, 10 N, and 0 N. Based on the Expressions 6-12 as discussed above, controller 160 may obtain a value of 5.46° for $d_{forward}$, and a value of –1.03° for $d_{left}$. Based on the values $d_{forward}$ and $d_{left}$, controller 160 may determine that the user signals the transportation device to move along a direction between forward and right. Controller 160 can continue receiving updated force measurement data from force sensor regions 140c-g and update the values of $d_{forward}$ and $d_{left}$. For example, for interval 508, controller 160 may obtain an updated values for $d_{forward}$ and $d_{left}$ and, based on the updated values, determine that the user signals the transportation device to move backward.

Moreover, as discussed above, controller 160 may also determine a sum of the forces, and compare the sum against a threshold to determine whether the user has fallen off (or in the middle of falling off) the transportation device. For example, referring back to FIG. 5A, at 15 seconds after the reference time point, the sum of force is 160 N, while the threshold, as determined during the initialization, can be half of $S_{sum}$ and equals 80 N. Based on the determination that the sum of force exceeds the threshold, controller 160 can determine that the user is still standing on the transportation device, and can maintain the motion state of the transportation device.

Figure 6:
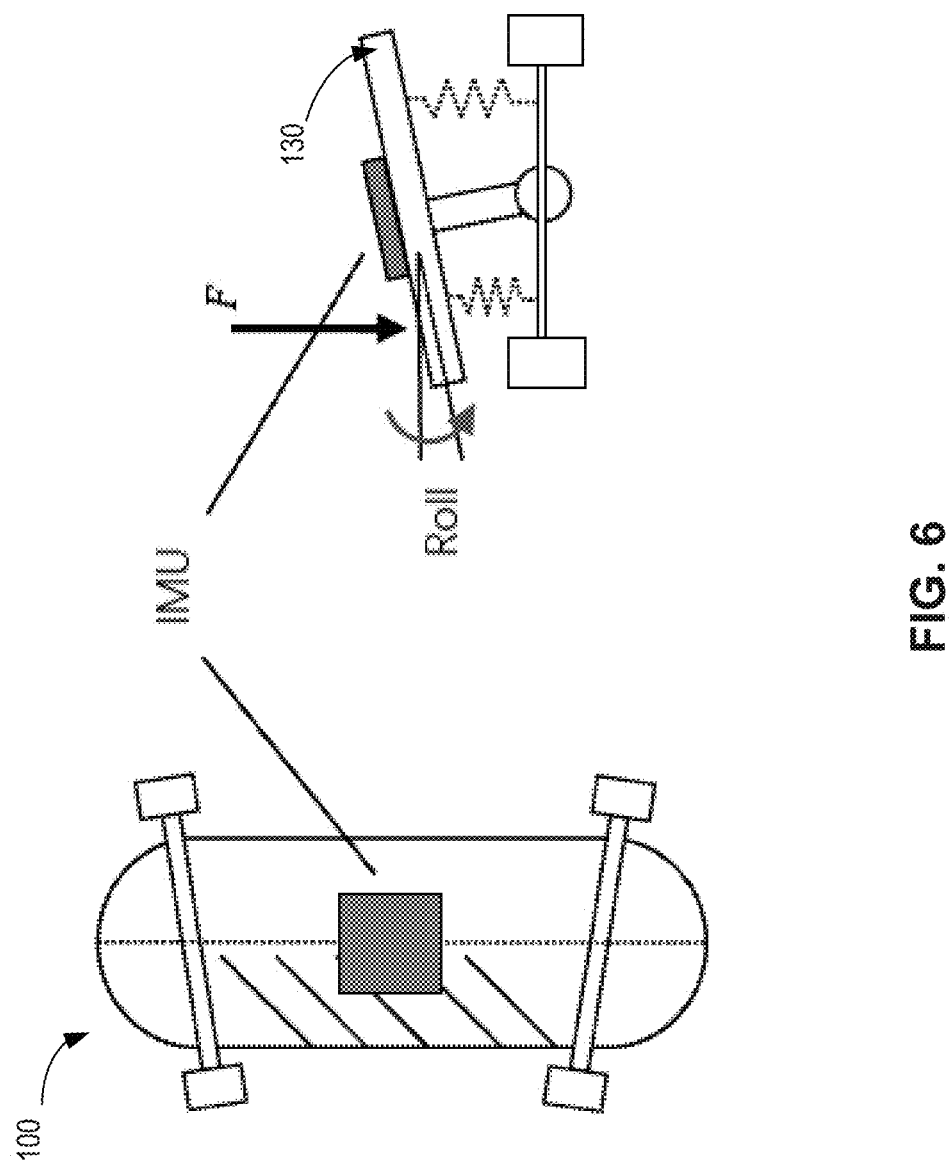
FIG. 6 illustrates an exemplary turning operation of an exemplary transportation device, consistent with embodiments of the present disclosure.

In some embodiments, the determination of the angle of tilting left ($d_{left}$) can take into account a rolling angle of deck 130. As an illustrative example, as shown in FIG. 6, when transportation device 100 makes a turn, deck 130 may tilt towards the turning direction. The tilting may occur due to uneven force exerted on the left and right edges of the deck, and can increase the magnitude of $d_{left}$. For example, if transportation device 100 is turning left, the actual tilting angle will be larger than $d_{left}$ determined based on the force distribution. On the other hand, if transportation device 100 is turning right, the actual tilting angle will be smaller than $d_{left}$ determined based on the force distribution (i.e., it becomes more negative). The rolling angle can be measured by the IMU attached on the bottom surface (or on the top surface) of deck 130.

To account for the fact that the deck also rotates at a certain angle when transportation device 100 makes a turn, controller 160 can determine $d_{left}$ by first determining a rolling angle $d_{roll}$ of deck 130 based on the following exemplary expressions:

$$d_{roll} = P_{roll} - S_{roll} \quad \text{(Expression 13)}$$

Here, $P_{roll}$ can be a rolling angle measured by the IMU, while $S_{roll}$ can be a reference rolling angle. $S_{roll}$ can be determined during the initialization state when the reference distribution was determined, which can also correspond to a state when transportation device 100 is moving in a straight line and is not turning.

Controller 160 can then determine an update $d_{left}$ based on the following exemplary expression:

$$d'_{left} = \lambda d_{left} + (1-\lambda) d_{roll} \quad \text{(Expression 14)}$$

The parameter $\lambda$ can be any value within the range of 0 to 1, and can be determined based on the characteristics of the IMU. The value of can be, for example, 0.5.

After determining the values for $d_{forward}$ and $d_{left}$, controller 160 can then determine a value of an acceleration. The value of $d_{forward}$ can indicate a tilting angle of the body of the user towards a forward direction (e.g., along direction A of FIG. 1B). The forward acceleration $a_{forward}$ (or backward acceleration, if $d_{forward}$ is negative) can be given by the following exemplary expression:

$$a_{forward} = K_{acc} \times d_{forward} \quad \text{(Expression 15)}$$

Here, the forward acceleration can be proportional to the degree of tilting forward, with $K_{acc}$ being a scaling factor, and $d_{forward}$ is the angle of forward tilting in radians. A typical value of $K_{acc}$ can be 10.

Controller 160 can then determine the target forward/backward speed ($V_{target}$) of transportation device 100 based on the following exemplary expression:

$$V_{target} = V_{current} + a_{forward} \times T \quad \text{(Expression 16)}$$

Here, T is a period during which deck 130 experiences the force distribution that leads to a certain value of $d_{forward}$ and $a_{forward}$.

Further, the value of $d_{left}$ can indicate a tilting angle of the body of the user towards left (or right, if $d'_{left}$ is negative). The centripetal acceleration is related to, for example, a distance between the front (or back) wheel pairs that provide the steering (W), and a difference in the linear speed between the wheel pair ($\Delta V$). The difference in the linear speed between the wheel pair ($\Delta V$) can be determined based on the following exemplary expression:

$$\Delta V = K_{dif} \times d'_{left} \quad \text{(Expression 17)}$$

Here, the difference in the linear speed ($\Delta V$) can be proportional to the degree of tilting left (or right), with $K_{dif}$ being a scaling factor. In some embodiments, $K_{dif}$ may be related to a distance between the front (or back) pairs (W) that provide the steering.

The target linear speed of a left wheel (e.g., left front wheel 110a) ($V_{L,target}$) and the target linear speed of a right wheel (e.g., right front wheel 110b) ($V_{R,target}$) can be determined based on the average linear speed ($V_{target}$) and the following expressions:

$$V_{L,target} = V_{target} - \Delta V \quad \text{(Expression 18)}$$

$$V_{R,target} = V_{target} + \Delta V \quad \text{(Expression 19)}$$

In some embodiments, controller 160 may also impose a limit on the acceleration based on a current speed of transportation device 100, and a prior state of operation. For example, referring to FIGS. 7A and 7B, if transportation device 100 just transits from the stationary state (i.e., having a zero speed) to the motion state, controller 160 may impose a limit of $a_0$ on the maximum acceleration that can be caused by the distribution of force (and the associated values of $d_{forward}$ and $d'_{left}$). As the speed of transportation device 100 increases, the acceleration limit can also increases, until it tops out at a value of $a_{max}$. Moreover, as the speed of transportation device 100 increases beyond a value of $v_2$, the acceleration limit may decrease, until to a point where the speed of the transportation device reaches the maximum speed $v_{max}$, at which point the acceleration limit can become zero. In that case, no further increase in the speed will be permitted. With such an arrangement, the safety of operation of transportation device 100 can be improved.

In some embodiments, transportation device 100 may include a feedback system, which includes controller 160, to control the speed and direction of movement based on the target speed and target direction. For example, after determining the target forward/backward speed $V_{target}$, controller 160 may determine a number of discrete steps of increasing (or decreasing) the speed, such that the acceleration (or deceleration) within a time interval between the discrete steps does not exceed the acceleration (or deceleration) limit according to FIG. 7A. For each discrete step, controller 160 may determine an intermediate target speed, and then generate a motor driving signal to the motor, to cause the motor to achieve the intermediate target speed. Controller 160 may also receive information from one or more motor sensors configured to measure a rotation speed of the motor, and determine a magnitude of the signal based on a difference between the intermediate target speed and a current linear speed (obtained based on the rotation speed) of the motor. In some embodiments, to achieve a predetermined dynamic characteristics of the feedback system (e.g., to achieve a certain degree of stability), controller 160 may also implement a proportional-integral-derivative (PID) controller to generate the motor driving signal based on the difference between the intermediate target speed and the current linear speed. Further, transportation device 100 may also determine, based on the information from the IMU, a turning angle and/or a turning rate of transportation device 100, and control the signals transmitted to the motors that drive the steering wheel pair, based on a difference between the turning angle (and/or turning rate) and the target direction (as determined from $d_{forward}$ and $d'_{left}$). Further, as discussed above, transportation device 100 may determine a pitch angle that indicates the device is going uphill or downhill, and control the signals transmitted to the motors to change their torques accordingly (e.g., increasing the torque for uphill movement, reducing the torque or introducing a reverse torque for downhill movement, etc.)

Figure 8:
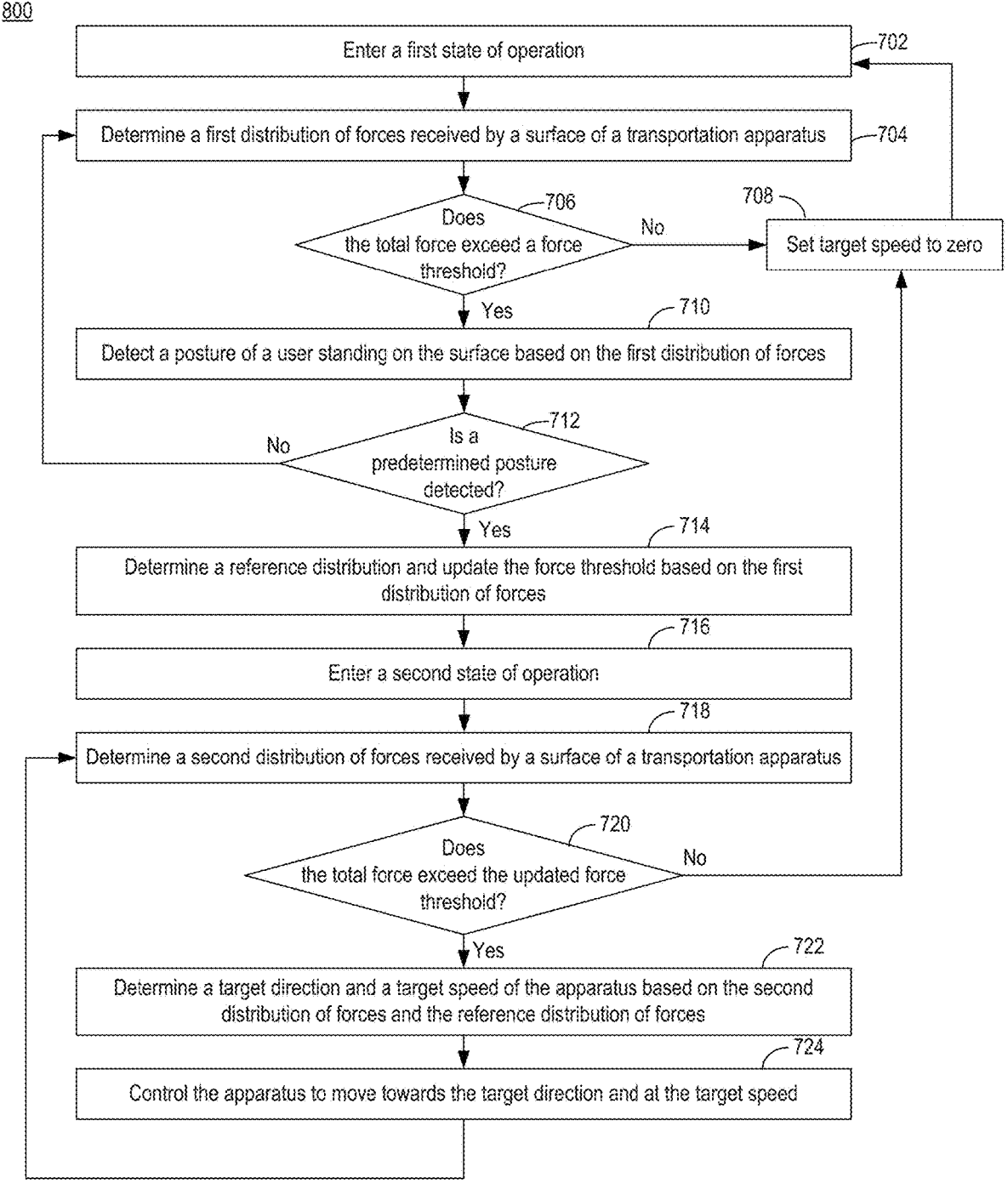
FIG. 8 is a flowchart of an exemplary method for controlling a transportation device, according to embodiments of the present disclosure.

Reference is now made to FIG. 8, which illustrates a sequence of steps that performs an exemplary process 800 for controlling a transportation device, according to embodiments of the present disclosure. The process of FIG. 8 may be implemented in software, hardware, or any combination thereof. For purposes of explanation and not limitation, the process 700 will be described in the context of transportation device 100, such that the disclosed process may be performed by software executing in controller 160.

In step 702, controller 160 enters a first state of operation. The first state of operation can be, for example, an initialization state, in which transportation device 100 is stationary. This can happen when transportation device 100 is just started up, or just came to a stop.

In step 704, controller 160 determines a first distribution of forces received by the top surface of transportation device 100. The first distribution of forces can be determined based on information provided by force sensor regions $140c$-$g$.

In step 706, controller 160 determines whether the total force exceeds a predetermined force threshold, to detect whether the user has fallen off (or in the middle of falling off) the transportation device. If controller 160 determines that the total force does not exceed the predetermined force threshold, controller 160 may proceed to step 708 and set the target speed of transportation device 100 to zero, to bring it to a stop. Afterwards, controller 160 may proceed back to step 702 and enter (or maintain) the first state of operation.

On the other hand, if controller 160 determines that the total force does exceed the predetermined force threshold, in step 706, controller 160 can proceed to step 710 to detect a posture of a user standing on the surface based on the first distribution of forces. The detection may include determining whether the force distribution data indicates a predetermined posture, such as a stable standing posture. The determination can be based on, for example, a variance value of samples of the forces received up to a current time point. If controller 160 determines, in step 712, that a stable standing posture is not detected (e.g., because the variance value exceeds a variance threshold, which may indicate that the user is still adjusting his or her posture, or is just getting up the transportation device, etc.), controller 160 may proceed back to 704 to acquire an updated set of forces.

On the other hand, if controller 160 determines that a stable standing posture is detected (in step 712), controller 160 may proceed to step 714 to determine a reference distribution and update the force threshold based on the first distribution of forces. The determination of reference distribution can be based on, for example, Expressions 1-5 as discussed above. The force threshold can also be updated as, for example, half of the total of the first distribution of forces.

After determining the reference distribution in step 714, controller 160 can proceed to step 716 and enter a second state of operation. The second state of operation may be, for example, the motion state, in which controller 160 can control a direction and a speed of movement of transportation device 100.

After entering the second state of operation in step 716, controller 160 can proceed to step 718 to determine a second distribution of forces received by the top surface of transportation device 100. The second distribution of forces can be determined based on information provided by force sensor regions, e.g., $140c$-$140g$.

After determining the second distribution of forces in step 718, controller 160 can proceed to step 720 to determine whether the total of the second distribution of forces exceed the updated force threshold. If the total does not exceed the updated force threshold, which may indicate the user has fallen off (or in the middle of falling off) the transportation device, controller 160 may proceed to step 708 to set the target speed to zero, and proceed back to step 702 to reenter the first state of operation If the total exceeds the updated force threshold, controller 160 can proceed to step 722 to determine a target direction and a target speed of transportation device 100 based on the second distribution of forces, and the reference distribution, based on Expressions 6-19 as stated above. For example, controller 160 may determine a linear acceleration and a target linear speed for a forward/backward movement. Controller 160 may also determine a difference in the rotation speed of motors for a steering wheel pair, and determine the target speed for each wheel of the wheel pair based on the difference. In some embodiments, controller 160 may also receive information about a rolling angle of deck 130, and include the rolling angle in the determination of target direction and target speed, based on Expressions 13 and 14 as stated above.

Figure 7A:
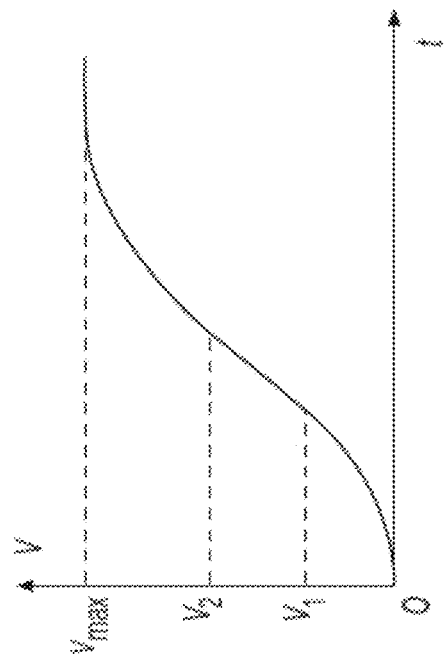
FIGS. 7A-7B illustrate exemplary methods of setting an acceleration limit, consistent with embodiments of the present disclosure.
Figure 7B:
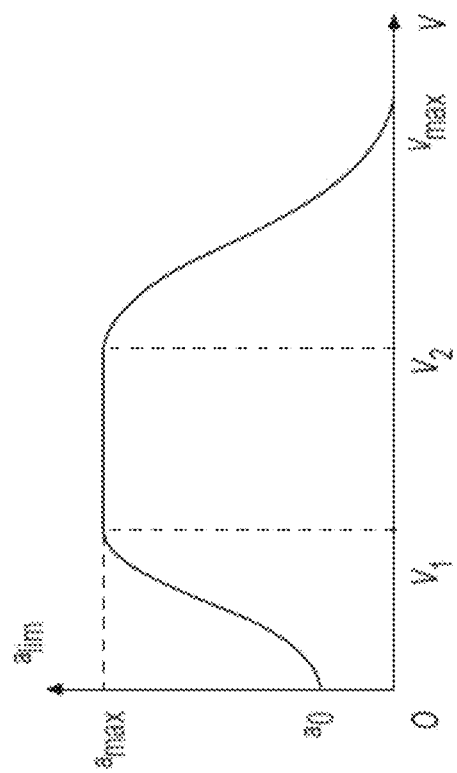

After determining the target direction and the target speed, controller 160 may proceed to step 724 to cause transportation device 100 to move towards the target direction, and at the target speed. For example, controller 160 may determine a number of intermediate steps in changing the linear speed of transportation device 100, such that the acceleration does not exceed a predetermined limit, which can also be correlated to the speed as illustrated in FIGS. 7A and 7B. Controller 160 may also be a part of a feedback loop that monitors a linear speed, and a turning speed and/or turning angle of transportation device 100, and adjusts the signals provided to the motor based on the monitored speed and angle information. Controller 160 may then proceed back to step 718 to receive updated second distribution of forces.

Figure 9:
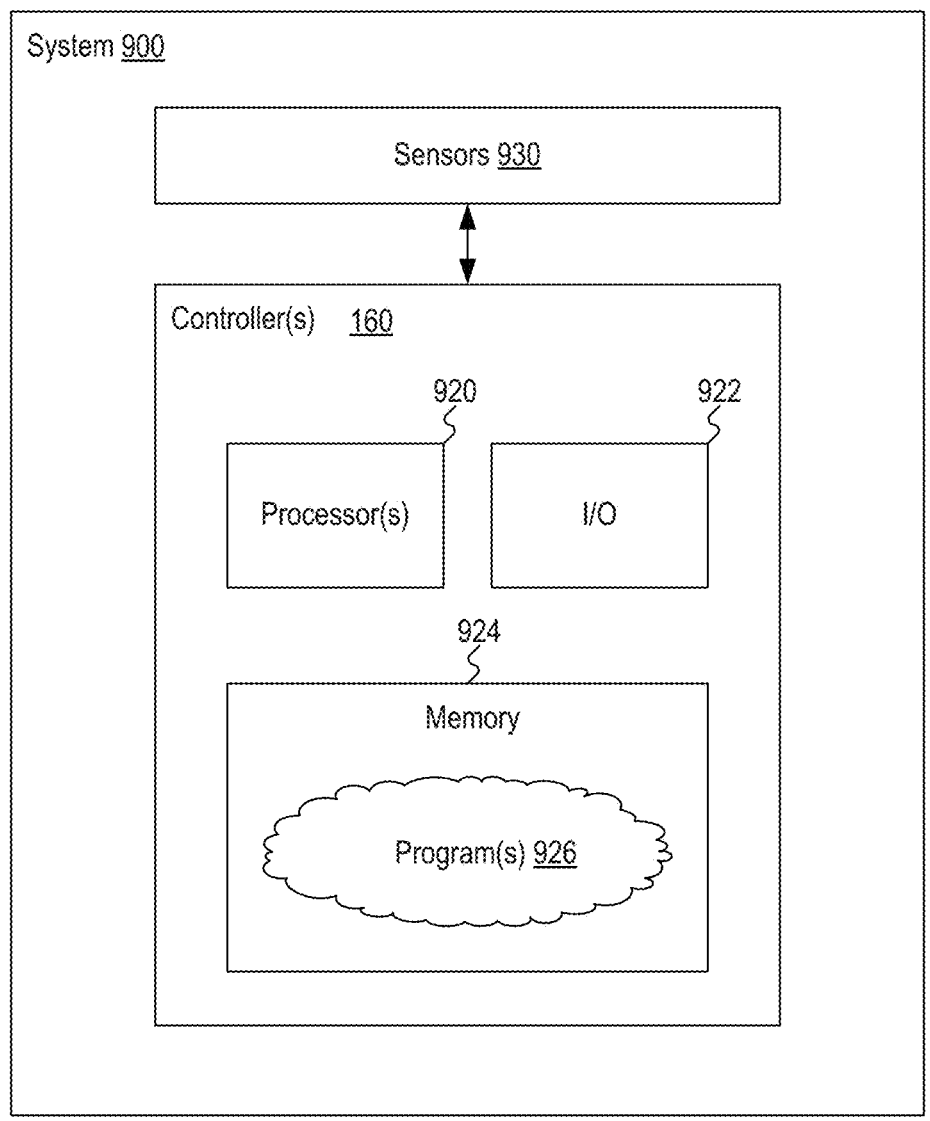
FIG. 9 is a block diagram of an exemplary system for controlling a transportation device, according to embodiments of the present disclosure.

Reference is now made to FIG. 9, which illustrates an exemplary system 900 that may be used in accordance with the disclosed embodiments. System 900 may include one or more controller(s) 160 of FIG. 1C, and one or more sensors 930. Controller 160 may include one or more processors 920, one or more I/O devices 922, and one or more memories 924. In some embodiments, system 900 may take the form of a mobile computing device, general-purpose computer, etc., for performing one or more operations consistent with the disclosed embodiments.

Processor 920 may include one or more known processing devices. For example, the processor may be from the family of processors manufactured by Intel, from the family of processors manufactured by Advanced Micro Devices, or the like. Alternatively, the processor may be based on the ARM architecture. In some embodiments, the processor may be a mobile processor. The disclosed embodiments are not limited to any type of processor configured in controller 160.

I/O devices 922 may be one or more devices configured to allow data to be received and/or transmitted by controller 160. The I/O devices 922 may include one or more communication devices and interfaces, and any necessary analog-to-digital and digital-to-analog converters, to communicate with and/or control other mechanical components and devices, such as sensors 930 and one or more motors (not shown in FIG. 9).

Memory 924 may include one or more storage devices configured to store software instructions used by the processor 920 to perform functions related to the disclosed embodiments. For example, the memory 924 may be configured to store software instructions, such as program(s) 926, that perform one or more operations when executed by the processor(s) 920. For example, memory 924 may include a single program 926, such as a user-level application, that performs the functions of the disclosed embodiments, or may comprise multiple software programs. Additionally, the processor 920 may execute one or more programs (or portions thereof) remotely located from controller 160. Furthermore, memory 924 also may be configured to store data, for example, for use by the software program(s) 926.

Sensors 930 may include, for example, force sensors, motor speed sensors, IMU, etc.

In some embodiments, systems 900 can be configured as transportation device 100, and software program(s) 926 can include one or more software modules that, when executed by controller 160, perform a method of controlling transportation device 100 based on a distribution of forces received by deck 130 and detected by sensors 930. The method may include, for examples, process 800 of FIG. 8.

The above description and accompanying drawings that illustrate exemplary embodiments should not be taken as limiting. Various mechanical, compositional, structural, chemical, electric, and operational changes may be made without departing from the scope of this description and the claims, including equivalents. In some instances, well-known structures and techniques have not been shown or described in detail so as not to obscure the disclosure. Those having ordinary skill in the art and access to the teachings provided herein will recognize additional modifications, applications, embodiments, and substitution of equivalents that all fall with the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the enclosed claims are not to be considered as limited by the foregoing description.

What is claimed is:

1. An apparatus for transportation, comprising:
a surface to receive a plurality of forces at a plurality of locations on the surface;
a plurality of force sensors, attached to the surface, to provide information related to the plurality of forces on the surface;
a plurality of wheels beneath the surface, wherein each of the plurality of wheels are coupled with a motor; and
a controller configured to:
enter an initialization state in which the apparatus is in a stationary state;
determine, based on the information provided by the plurality of force sensors, a first plurality of forces at the plurality of locations;
determine, based on the first plurality of forces, a reference distribution of forces associated with the plurality of locations in the initialization state;
enter a motion state;
determine, based on the information provided by the plurality of force sensors, a second plurality of forces at the plurality of locations;
determine, based on the second plurality of forces, an updated distribution of forces associated with the plurality of locations in the motion state;
determine a relationship between the reference distribution of forces and the updated distribution of forces;
determine a target speed of the apparatus based on the relationship; and
provide one or more first signals to the motors to cause the apparatus to move at the target speed, wherein
the apparatus further comprises a rolling angle measurement device configured to measure a rolling angle of the surface with respect to a horizontal surface; wherein the controller is further configured to determine a differential rotational speed between at least two of the plurality of wheels based on the rolling angle, wherein the rolling angle is determined as the difference between the rolling angle measured by the rolling angle measurement device and the reference rolling angle determined at the initialization state.

2. The apparatus of claim 1, wherein the controller determines, based on the first plurality of forces, whether a user is standing with a first predetermined posture on the surface;
   wherein the reference distribution of forces is determined based on the first plurality of forces after determining that the user is standing with a predetermined posture on the surface.

3. The apparatus of claim 2, wherein the controller is to:
   determine whether the apparatus is in a stationary state;
   upon determining that the apparatus is stationary and that the user is not standing with the first predetermined posture on the surface, maintain the stationary state.

4. The apparatus of claim 1, wherein the controller is to:
   determine a threshold of total force based on the first plurality of forces;
   determine whether a total of the second plurality of forces is below the threshold of total force; and
   upon determining that the total of the second plurality of force is below the threshold of total force, cause the apparatus to enter or maintain a stationary state.

5. The apparatus of claim 1, wherein the surface includes a left portion, a right portion, a front portion, and a rear portion; and wherein the controller is to:
   determine a target turning direction of the apparatus based on: a first force of the second plurality of forces received on the left portion of the surface, a second force of the second plurality of forces received on the right portion of the surface, a third force of the second plurality of forces received on the front portion of the surface, and a fourth force of the second plurality of forces received on the rear portion of the surface; and
   provide one or more second signals to the motors based on the target turning direction.

6. The apparatus of claim 1, wherein the controller is further configured to determine the differential rotational speed based on a distance between the at least two of the plurality of wheels.

7. The apparatus of claim 1, further comprising a pitch angle measurement device configured to measure a pitch angle of the surface with respect to a horizontal surface; wherein the controller is further configured to determine one or more torques of the motors based on the pitch angle.

8. The apparatus of claim 1, wherein the controller is further configure to:
   determine a target acceleration or a target deceleration based on the reference distribution of forces and the updated distribution of forces;
   determine an acceleration limit or a deceleration limit based on a current speed of the apparatus;
   if the target acceleration exceeds the acceleration limit, or if the target deceleration exceeds the deceleration limit, determine a plurality of intermediate steps of updating the current speed to reach the target speed.

9. The apparatus of claim 1, wherein the plurality of force sensors provides information related to at least four forces at at least four locations on the surface.

10. A computer-implemented method for controlling a transportation device, comprising:
    entering an initialization state in which the transportation device is in a stationary state;
    receiving, from a plurality of force sensors attached to a surface of the transportation device, information about a first plurality of forces received at a plurality of locations on the surface;
    determining via a controller, based on the first plurality of forces, a reference distribution of forces associated with the plurality of locations in the initialization state;
    entering a motion state;
    receiving, from the plurality of force sensors, information about a second plurality of forces at the plurality of locations;
    determining, based on the second plurality of forces, an updated distribution of forces associated with the plurality of locations in the motion state;
    determining a relationship between the reference distribution of forces and the updated distribution of forces;
    determining, via the controller, a target speed of the transportation device based on the relationship; and
    providing, via on the controller, one or more first signals to one or more motors of the transportation device to cause the transportation device to move at the target speed, wherein
    the method further comprises:
    receiving, from a rolling angle measurement device, a rolling angle of the surface with respect to a horizontal surface; and
    determining, via the controller, the differential rotational speed based on the rolling angle, wherein the rolling angle is determined as the difference between the rolling angle measured by the rolling angle measurement device and the reference rolling angle determined at the initialization state.

11. The method of claim 10, further comprising:
    determining via on the controller, based on the first plurality of forces, whether a user is standing with a first predetermined posture on the surface;
    wherein the reference distribution of forces is determined based on the first plurality of forces after determining that the user is standing with a predetermined posture on the surface.

12. The method of claim 10, further comprising:
    determining, via on the controller, a threshold of total force based on the first plurality of forces;
    determining, via on the controller, whether a total of the second plurality of forces is below the threshold of total force;
    upon determining that the total of the second plurality of forces is below the threshold of total force, causing the apparatus to enter or maintain a stationary state.

13. The method of claim 10, wherein the surface includes a left portion, a right portion, a front portion, and a rear portion; the method further comprising:
    determining, via on the controller, a target turning direction of the transportation device based on: a first force of the second plurality of forces received on the left portion of the surface, a second force of the second plurality of forces received on the right portion of the surface, a third force of the second plurality of forces received on the front portion of the surface, and a fourth force of the second plurality of forces received on the rear portion of the surface; and
    providing one or more second signals to the one or more motors based on the target turning direction.

14. The method of claim 13, wherein the one or more second signals generate a differential rotational speed between at least two of the plurality of wheels.

15. The method of claim 10, further comprising: determining, via on the controller, the differential rotational speed based on a distance between the at least two of the plurality of wheels.

16. The method of claim 10, further comprising:
- determining, via on the controller, a target acceleration or a target deceleration based on the reference distribution of forces and the updated distribution of forces;
- determining, via on the controller, an acceleration limit or a deceleration limit based on a current speed of the apparatus;
- if the target acceleration exceeds the acceleration limit, or if the target deceleration exceeds the deceleration limit, determining a plurality of intermediate steps of updating the current speed to reach the target speed.

17. The method of claim 10, further comprising:
- receiving, from a pitch angle measurement device, a pitch angle of the surface with respect to a horizontal surface; and
- providing one or more third signals to the one or more motors to update one or more torques of the motors based on the pitch angle.

18. The method of claim 10, wherein the method further comprises receiving, from the plurality of force sensors, information related to at least four forces at at least four locations on the surface.

\* \* \* \* \*